(12) United States Patent
Chen et al.

(10) Patent No.: US 9,578,679 B1
(45) Date of Patent: Feb. 21, 2017

(54) DOWNLOAD LOCALIZED PORTION OF LARGE DATABASE BASED ON CELLULAR NETWORK TOPOLOGY

(75) Inventors: Ben Chen, Northboro, MA (US); Rohit Satish Kalbag, Bridgewater, NJ (US); Robert Martin Ephraim, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 1206 days.

(21) Appl. No.: 12/823,648

(22) Filed: Jun. 25, 2010

(51) Int. Cl.
*H04W 84/12* (2009.01)
*H04W 84/18* (2009.01)
*H04W 80/04* (2009.01)

(52) U.S. Cl.
CPC ............. *H04W 84/12* (2013.01); *H04W 84/18* (2013.01); *H04W 80/04* (2013.01)

(58) Field of Classification Search
CPC ....... H04W 84/12; H04W 84/18; H04W 80/04
See application file for complete search history.

(56) References Cited

U.S. PATENT DOCUMENTS

| | | | |
|---|---|---|---|
| 2004/0048620 A1* | 3/2004 | Nakahara et al. | 455/456.1 |
| 2005/0153730 A1* | 7/2005 | Turetzky et al. | 455/550.1 |
| 2009/0160711 A1* | 6/2009 | Mehta | 342/450 |
| 2011/0039578 A1* | 2/2011 | Rowitch et al. | 455/456.1 |
| 2011/0159818 A1* | 6/2011 | Scherzer et al. | 455/67.11 |
| 2011/0201360 A1* | 8/2011 | Garrett et al. | 455/457 |
| 2011/0207472 A1* | 8/2011 | Abraham et al. | 455/456.1 |
| 2011/0256853 A1* | 10/2011 | Gupta et al. | 455/414.1 |

* cited by examiner

*Primary Examiner* — Walter Divito

(57) ABSTRACT

A wireless mobile communication device includes a wireless communication subsystem configured to wirelessly communicate through a local data access point to cause a query to be delivered to a remote access point location database. The location database contains information about the location of local data access points within a widespread area. The query is for location information for data access points located near the wireless device. The wireless device receives nearby access point location information from the database, and the device causes at least a portion of the access point location information to be delivered to a user. This may be done through a user interface, upon request of the user, and while the wireless communication subsystem is not connected to a local data access point.

19 Claims, 2 Drawing Sheets

DOWNLOAD LOCALIZED PORTION OF LARGE DATABASE BASED ON CELLULAR NETWORK TOPOLOGY

BACKGROUND

Technical Field

This disclosure relates to wireless mobile communication devices, including the identification of local data access points through which these devices may connect.

Description of Related Art

Wireless mobile communication devices, such as smart cell phones, laptops, and PDA's often utilize a local data access point, such as a WiFi hot spot, in order to connect to network information, such as to websites and email. Locating publicly-available local data access points, however, can be challenging.

There are on line databases which contain the location of publicly-available local data access points throughout large geographic areas, such as throughout the United States. However, a data connection to this database must usually first be made in order to access its data. Such a data connection may not be available to a user of a wireless mobile communication device which has not yet established connectivity through a local data access point.

Some users may also access online data through a data service provided by a cell phone carrier. However, the user may incur charges in order to utilize this service. The use of this data service may also be slow and cumbersome.

A user might also access and download the database of local data access points when the user has data connectivity through a local data access point. However, these data bases can be very large, requiring substantial memory in the wireless mobile communication device. Further, the information in the database may change frequently, requiring frequent updates.

SUMMARY

A wireless mobile communication device may include a wireless communication subsystem configured to wirelessly communicate through a local data access point, a location identification subsystem configured to determine the location of the wireless mobile communication device, a memory subsystem configured to store data, a user interface, and a processing subsystem. The processing subsystem may be configured to cause a query to be delivered to a remote access point location database. The remote access point location database may contain access point information about the location of local data access points within a widespread area. The query may be for information about the location of data access points near the location of the wireless mobile communication device, as determined by the location identification subsystem. The nearby access point location information may be a subset of the widespread access point location information. The processing subsystem may be configured to cause nearby access point location information returned from the remote access point location database as a result of the query to be stored in the memory subsystem. The processing subsystem may be configured to cause at least a portion of the nearby access point location information stored in the memory subsystem to be delivered to a user of the mobile communication device. This may be done through the user interface, upon request of the user, and while the wireless communication subsystem is not connected to a local data access point.

The wireless communication subsystem may be configured to communicate with the nearest one of a plurality of different wireless communication systems. The location identification subsystem may be configured to determine the location of the wireless mobile communication device based on the identity of the wireless communication system with which the wireless communication subsystem is communicating.

The location identification subsystem may be configured to cause a query to be delivered to a remote system location database. The remote system location database may contain system location information identifying the geographic area serviced by each of the wireless communication systems. The query may contain information indicative of the identity of the wireless communication system with which the wireless communication subsystem is communicating.

The each wireless communication system may have a System Identification (SID) number. The remote system location database may include information indicative of the geographic area serviced by each wireless communication system based on its SID. The query caused to be delivered by the location identification subsystem may include the SID of the wireless communication system with which the wireless communication subsystem is communicating.

The wireless communication subsystem may be configured to communicate with the nearest one of a plurality of different wireless communication networks within one of a plurality of different wireless communication systems. The location identification subsystem may be configured to determine the location of the wireless mobile communication device based on the identity of the wireless communication network and the wireless communication system with which the wireless communication subsystem is communicating.

The location identification subsystem may be configured to cause a query to be delivered to a remote network location database. The remote network location database may contain location information identifying the geographic area serviced by each of the wireless communication networks within each of the wireless communication systems. The query may contain information indicative of the identity of the wireless communication network within the wireless communication system with which the wireless communication subsystem is communicating.

Each wireless communication system may have a System Identification (SID) number, and each wireless communication network may have a Network Identification (NID) number. The remote network location database may include information indicative of the geographic area serviced by each wireless communication network within each wireless communication system based on its NID and SID, respectively. The query caused to be delivered by the location identification subsystem may include the SID and the NID of the wireless communication network within the wireless communication system with which the wireless communication subsystem is communicating.

The processing subsystem may be configured to cause the stored nearby access point location information to be updated by causing an additional query of any of the types referred to above to be delivered to the remote access point location database and by causing the nearby access point location information which is returned as a result to be stored in the memory subsystem. The processing subsystem may be configured to cause the stored nearby access point location information to be updated periodically and/or in response to changes in the location of the wireless mobile communication device as determined by the location identification system.

The local data access points through which the wireless communication subsystem is configured to wireless communicate may be local WiFi hotspots. The widespread access point information and the returned nearby access point location information may include street addresses for the local WiFi hotspots.

The processing subsystem may be configured to allow a user to search through the stored nearby access point information using the user interface to locate one or more local data access points which are nearest to the location of the wireless mobile communication device, as determined by the location identification subsystem.

The processing subsystem may be configured to identify one or more of the local data access points within the stored nearby access point information that are within connectivity range of the wireless mobile communication device.

The processing subsystem may be configured to cause the wireless communication system to log onto one of the identified local data access points within the stored nearby access point information that is within connectivity range of the wireless mobile communication device.

A nearby access point location information server may provide nearby access point location information about the location of local data access points within a geographic area serviced by a wireless communication system identified by a System Identification (SID) number. The server may include a network communication subsystem configured to receive a request for the nearby access point location information, including the SID of the wireless communication system, and to deliver the nearby access point location information in response. The server may include a processing subsystem. The processing subsystem may be configured to receive the request from the network communication subsystem, including the SID of the wireless communication system. The processing subsystem may be configured to query a system location database which contains system location information indicative of the geographic area serviced by each of a plurality of wireless communication systems based on its SID for the geographic area serviced by the wireless communication system having the received SID. The processing subsystem may be configured to query an access point location database which contains widespread access point information about the location of local data access points within a widespread area for the nearby access point information based on the determined geographic area of the wireless communication system. The processing subsystem may be configured to deliver the determined nearby access point location information to the network communication system. The system location database may or may not be part of the remote access point location server.

A system location information server may provide system location information identifying the geographic area serviced by a wireless communication system identified by a System Identification (SID) number. The server may include a network communication subsystem configured to receive a request for the system location information, including the SID of the wireless communication system, and to deliver the system location information in response. The server may include a processing subsystem. The processing subsystem may be configured to receive the request from the network communication subsystem, including the SID of the wireless communication system. The processing subsystem may be configured to query a system location database which contains system location information indicative of the geo-graphic area serviced by each of a plurality of wireless communication systems based on its SID for the geographic area serviced by the wireless communication system having the received SID. The processing subsystem may be configured to deliver the determined system location information to the network communication system.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

Figure 1:
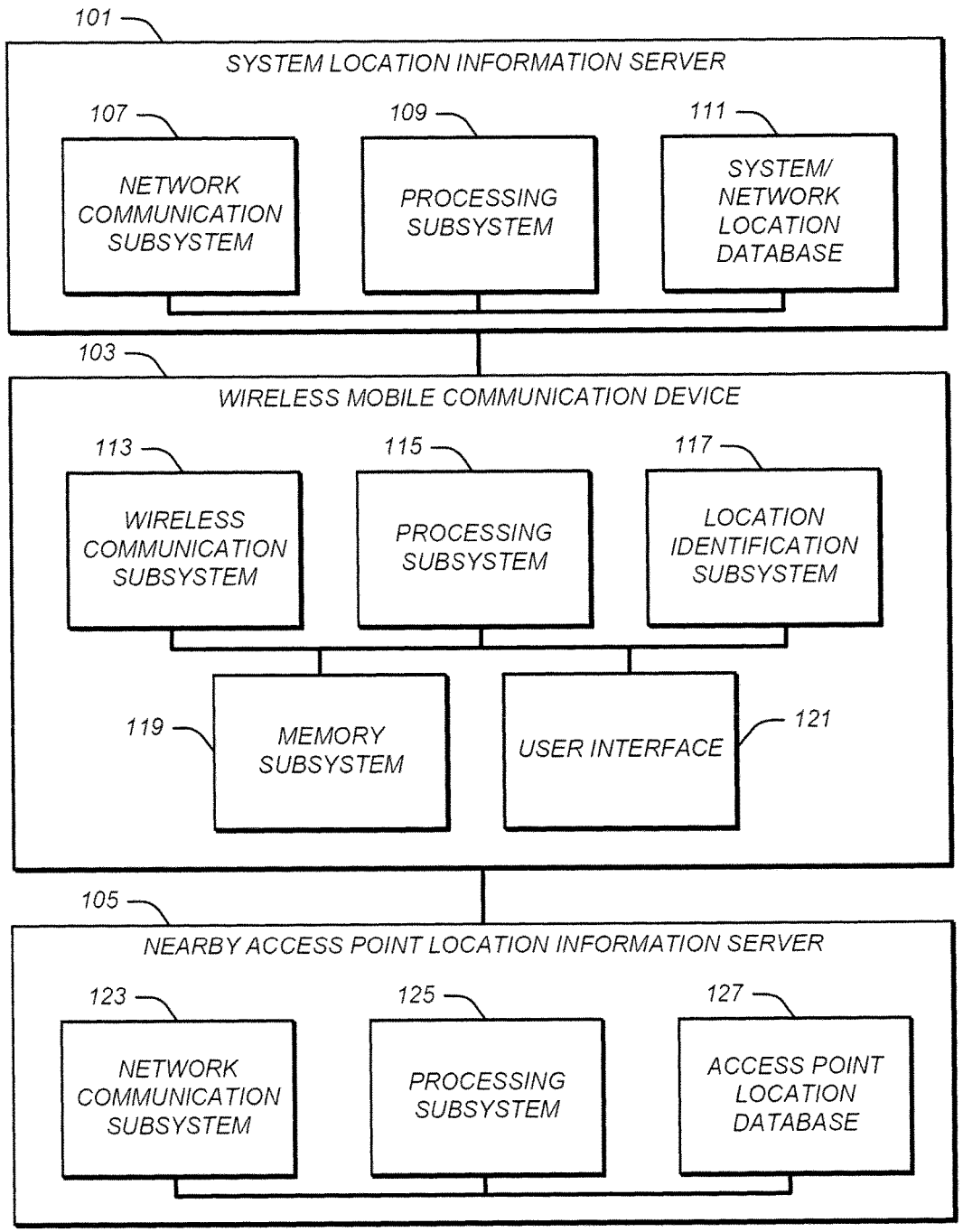
FIG. 1 illustrates components of a wireless communication system which provides a user with up-to-date information about the location of local data access points.

FIG. 1 illustrates components of a wireless communication system which provides a user with up-to-date information about the location of local data access points.

The wireless communication system may include one or more system location information servers, such as the system location information server 101, one or more wireless mobile communication devices, such as the wireless mobile communication device 103, and one or more nearby access point location information servers, such as the nearby access point location information server 105.

The system location information server 101 may include a network communication subsystem 107, a processing subsystem 109, and/or a system/network location database 111. The system location information server 101 may include one or more additional components and/or not all of the components illustrated in FIG. 1.

The wireless mobile communication device 103 may include a wireless communication subsystem 113, a processing subsystem 115, a location identification subsystem 117, a memory subsystem 119, and/or a user interface 121. The wireless mobile communication device 103 may include one or more additional components and/or not all of the components illustrated in FIG. 1.

The nearby access point location information server 105 may include a network communication subsystem 123, a processing subsystem 125, and/or an access point location database 127. The nearby access point location information server 105 may include one or more additional components and/or not all of the components illustrated in FIG. 1.

The system location information server 101 and/or the nearby access point location information server 105 may be configured to function as a server in a wired or wireless communication system, such as a server connected to the internet. An appropriate gateway may be provided between wireless devices in the wireless communication system and one or more of these servers. Each of the servers may be configured to receive requests for information and to provide the requested information in response.

The wireless mobile communication device 103 may be of any type. For example, the wireless mobile communication device 103 may be a smart cell phone, a laptop, and/or a PDA.

The wireless communication subsystem 113 may be configured to wirelessly communicate through a local data access point. The location identification subsystem 117 may be configured to determine the location of the wireless mobile communication device 103. The memory subsystem 119 may be configured to store data. The user interface 121 may be configured to communicate information between a user and the wireless mobile communication device 103.

The processing subsystem 115 may be configured to perform a variety of functions. For example, the processing subsystem 115 may be configured to cause a query to be delivered to a remote access point location database, such as the access point location database 127. The access point location database 127 may be remote from the wireless mobile communication device 103. The access point location database 127 may contain widespread access point information about the location of local data access points within a widespread area. The query may be configured to obtain nearby access point location information. The nearby access point location information may be about the location of local data access points near the location of the wireless mobile communication device 103, as determined by the location identification subsystem. The nearby access point location information may be a subset of the widespread access point location information contained within the access point location database 127. For example, the widespread access point information may provide information about the location of local data access points within an entire country or even the world. The nearby access point location information, on the other hand, may merely specify information about the location of data access points within a mile of the wireless mobile communication device 103 or within some other defined geographic region.

The processing subsystem 115 may be configured to cause nearby access point location information returned from the access point location database 127 as a result of the query to be stored in the memory subsystem 119.

The processing subsystem 115 may be configured to cause at least a portion of the nearby access point location information stored in the memory subsystem 119 to be delivered to a user of the mobile communication device through the user interface 121. This delivery may occur upon request of the user, made through the user interface 121. This delivery may occur while the wireless mobile communication system is not connected to a local data access point.

The wireless communication subsystem 113 may be configured to communicate with the nearest one of a plurality of different wireless communication systems. In a cell phone system, for example, the wireless communication subsystem 113 may be configured to communicate with the nearest wireless communication system which is part of the cell phone system. The wireless communication subsystem 113 may be configured to do so over a data connection offered by the cell phone system. The wireless communication subsystem 113 may be configured to do so, in addition to being configured to communicate through a local data access point, as discussed above.

The location identification subsystem 117 may be configured to determine the location of the wireless mobile communication device based on the identity of the wireless communication system with which the wireless communication subsystem 113 is communicating. The location identification subsystem 117 may be configured to cause a query to be delivered to a remote system location database, such as to the system/network location database 111. The system/network location database 111 may be remote from the wireless mobile communication device 103. The system/network location database may contain system location information identifying the geographic area served by each of the wireless communication systems. The query from the location identification subsystem 117 may contain information indicative of the identity of the wireless communication system with which the wireless communication subsystem 113 is communicating.

Each wireless communication system may have a System Identification (SID) number. The system/network location database may include information indicative of the geographic area service by each wireless communication system, based on its SID. The geographic area may be specified by the names of boundary streets, by geographic coordinates which specify the location of points around the perimeter of the geographic area, and/or by any other means. The system/network location database 111 may cross-reference each SID to one of these geographic area descriptions. The query caused to be delivered by the location identification subsystem 117 may include the SID of the wireless communication system with which the wireless communication subsystem 113 is communicating.

The wireless communication subsystem 113 may be configured to communicate with the nearest one of the plurality of different wireless communication networks within one of a plurality of different wireless communication systems. The location identification subsystem 117 may be configured to determine a location of the wireless mobile communication device based on the identity of the wireless communication network and the wireless communication system with which the wireless communication subsystem 113 is communicating.

The query delivered by the location identification subsystem 117 may contain information indicative of the identity of the wireless communication network within the wireless communication system with which the wireless communication subsystem 113 is communicating.

Each wireless communication network may have a Network Identification (NID) number. The system/network location database may include information indicative of the geographic area serviced by each wireless communication network within each wireless communication system, based on their respective NID and SID. The query caused to be delivered by the location identification subsystem 117 may include the SID and the NID of the wireless communication network within the wireless communication system with which the wireless communication subsystem 113 is communicating.

The processing subsystem 115 may be configured to cause the nearby access point location information which is stored in the memory subsystem 119 to be updated. The processing subsystem 115 may be configured to do so by causing an additional query of one of the types discussed above to be delivered to the access point location database 127 and by causing the nearby access point location information which is returned as a result to be stored in the memory subsystem 119. The processing subsystem 115 may be configured to cause the stored nearby access point location information to be updated periodically and/or in response to changes in the location of the wireless mobile communication device 103, as determined by the location identification subsystem 117.

The local data access points through which the wireless communication subsystem 113 is configured to wirelessly communicate may be local WiFi hot spots. The widespread access point information and the nearby access point location information which is returned may both include street addresses, coordinates, and/or other location-specifying information for each of the local WiFi hot spots.

The processing subsystem 115 may be configured to allow a user to search through the nearby access point information stored in the memory subsystem 119 using the user interface 121 in order to locate one or more local data access points which are nearest to the location of the wireless mobile communication device 103, as determined by the location identification subsystem 117.

The processing subsystem 115 may be configured to identify one or more of the local data access points within the stored nearby access point information that are within connectivity range of the wireless mobile communication device 103.

The processing system may be configured to cause the wireless communication subsystem 113 to log onto one of the identified local data access points within the stored nearby access point information that is within connectivity range of the wireless mobile communication device 103. The processing subsystem 115 may be configured to do so on an automated basis, or to instead propose such a log on for approval by a user.

The system location information server 101 may be configured to provide system location information identifying the geographic areas serviced by a wireless communication system identified by an SID number. The information server may in addition be configured to provide network location information identifying the geographic area serviced by a wireless communication network identified by an NID within a wireless communication system identified by an SID.

The network communication subsystem 107 within the system location information server 101 may be configured to receive a request for the system location information and/or the network location information, including the SID of the wireless communication system and/or the NID of the network communication system. The network communication subsystem 107 may be configured to deliver the system and/or network location information in response.

The processing subsystem 109 may be configured to receive the request from the network communication subsystem 107 for the system/network location information, including the SID of the wireless communication system and/or the NID of the network communication system. The processing subsystem 109 may be configured to query the system/network location database 111 for the geographic area serviced by the wireless communication system having the received SID and/or the network communication system having the received NID. The processing subsystem 109 may be configured to deliver the determined system/network location information to the network communication subsystem 107, for delivery back to the source of the location query.

The nearby access point location information server 105 may be configured to provide nearby access point location information about the location of local data access points within a geographic area serviced by a wireless communication system and/or a network communication system. The network communication subsystem 123 may be configured to receive a request for the nearby access point location information. The request may include information indicative of a subset of the geographic area covered by the information in the access point location database 127. The processing subsystem 125 may be configured to query the access point location database 127 for the nearby access point information that is within the geographic area specified by the query received by the network communication subsystem 123. The processing subsystem 125 may be configured to deliver the determined nearby access point location information to the network communication subsystem 123 for delivery back to the source of the location query.

Figure 2:
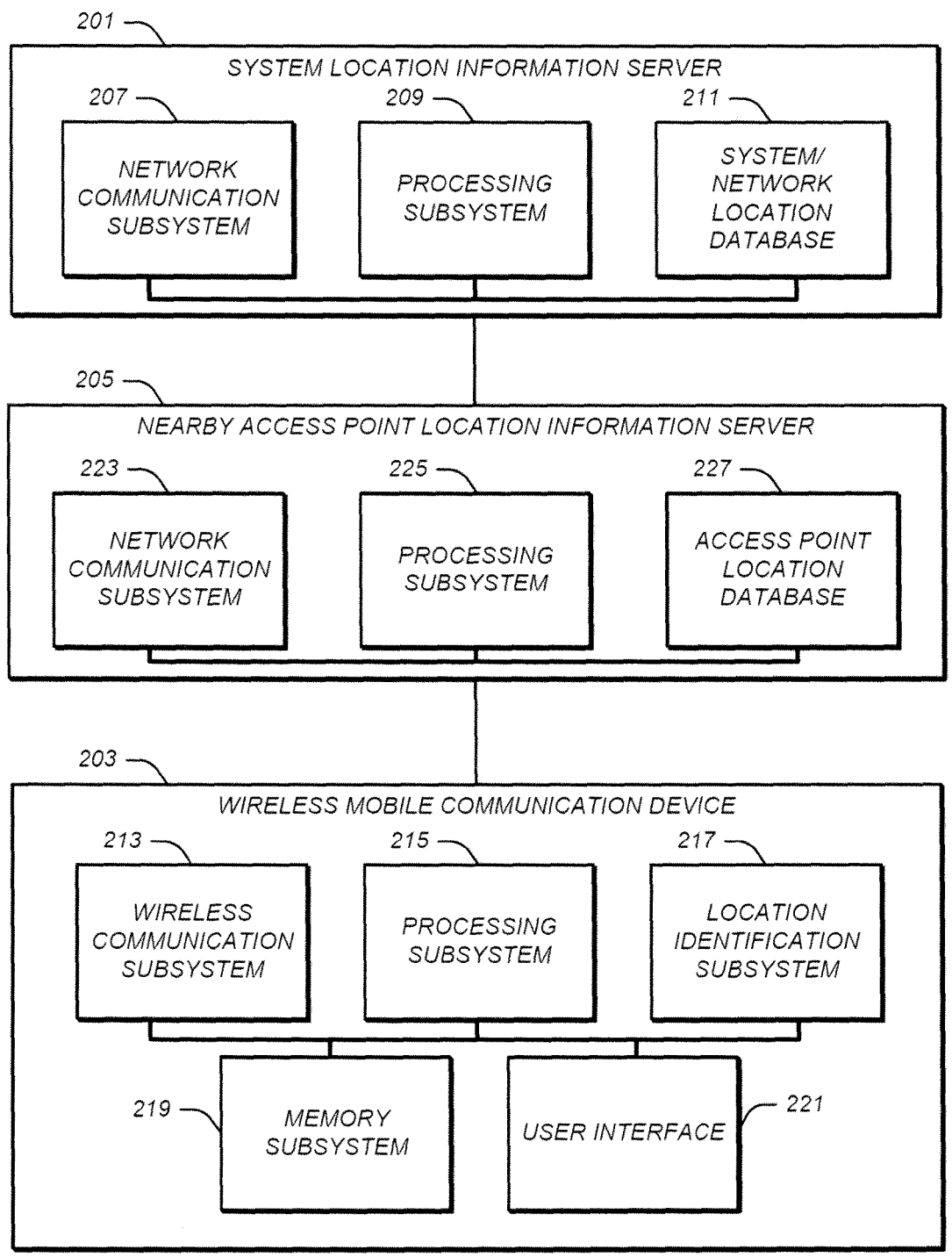
FIG. 2 illustrates components of another configuration of a wireless communication system which provides a user with up-to-date information about the location of local data access points.

FIG. 2 illustrates components of another configuration of a wireless communication system which provides a user with up-to-date information about the location of local data access points.

The components illustrated in FIG. 2 may function in the same way as the correspondingly-numbered components illustrated in FIG. 1 (with 100 added to their charter reference number), except for the distinctions now discussed.

Unlike the configuration illustrated in FIG. 1, for example, the wireless mobile communication device 203 may not be configured to query the system location information server 201 for the geographic location of the system and/or network communication system with which the wireless communication subsystem 213 is communicating. Instead, the processing subsystem 215 may be configured to direct the wireless communication subsystem 213 to deliver to the nearby access point location information server 205 information which merely identifies the system and/or network communication system with which the wireless communication subsystem 213 is communicating, such as referencing its SID and/or NID. In this configuration, the processing subsystem 225 within the nearby access point location information server 205 may be configured to cause the network communication subsystem 223 to issue a query to a system location information server 201 for the geographic area covered by the system and/or network communication system identified by the communication from the wireless mobile communication device 203. The system location information server 201 may respond to this request by providing information indicative of that geographic area, just like was described above in connection with the system location information server 101. However, the system location information server 201 may return that geographic information to the nearby access point location information server 205, rather than to the wireless mobile communication device 203, as illustrated in FIG. 1. The nearby access point location information server 205 may then process that geographic information in the same way as discussed above in connection with the nearby access point location information server 105, so as to deliver back to the wireless mobile communication device 203 the nearby access point location information.

In other words, the nearby access point location information server 205 may take upon itself the task of obtaining the desired geographic area information from the system location information server 201, rather than having this done by the wireless mobile communication device 203, as illustrated in FIG. 1 and discussed above.

In a still further configuration, the system/network location database 211 may be housed within the nearby access point location information server 205. In this configuration, the processing subsystem 225 may not need to be configured to cause a query to be delivered to a remote server in order to obtain the desired geographic area information, but may instead query its own local copy of the system/network location database 211. In this configuration, the processing subsystem 235 may be configured to obtain periodic updates to the system/network location database 211 which in this configuration, may be stored within the nearby access point location information server 205.

The various components which have now been discussed may include appropriate hardware and software configured to cause each of these components to perform the functions which have been discussed above. For example, the wireless communication subsystems 113 and 213 may include one or more transmitters, receivers, antenna, and signal processing subsystems. As indicated above, the wireless communication subsystems 113 and 213 may be configured to wirelessly communicate through a local data access point and/or over a data channel on a cellular telephone network.

The network communication subsystems 107, 123, 207, and 223 may similarly include appropriate hardware and software configured to enable the network communication subsystems to receive queries for information over a computer network system and to return responses to those queries, addressed to the senders of those queries.

The processing subsystems 109, 115, 125, 209, 215, and 225 may similarly include one or more hardware devices, such as one or more microprocessors and related support components, as well as software, again configured to enable the processing subsystems to perform the functions which have been described above, as well as other functions.

The memory subsystems 119 and 219 may include one or more memory devices, such as one or more hard disc drives, flash memories, RAMS, and/or ePROMS. Again, the memory subsystems may be configured to perform the functions recited above, as well as other functions.

The various databases which have been discussed, such as the system/network location databases 111 and the access point location databases 127 and 227 may be stored on one or more electronic storage devices, such as one or more hard disc drives, flash memories, RAMS, and/or ePROMS. The databases may be configured in any format and with any structure.

The location identification subsystems 117 and 217 may similarly include hardware and software configured to perform the functions recited above and/or other functions. They may include one or more microprocessors and support microprocessor support components. Although indicated as being separate from the processing subsystems, the location identification subsystems 117 and 227 may, in fact, merely be an additional function taken on by their respective processing subsystems 115 and 215, respectively.

The user interface 121 may include any type of user interface device, such as one or more keyboards, mice, displays, touch screens, microphones, sound generating devices, and/or cameras.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. A wireless mobile communication device comprising:
a wireless communication subsystem configured to wirelessly communicate through WiFi data access points and at least one cellular wireless communication network;
a memory subsystem configured to store data;
a user interface; and
a processing subsystem configured to:
receive through the wireless communication subsystem, from a cellular wireless communication network located within connectivity range of the wireless mobile communication device, an identifier for a cellular wireless communication system associated with the cellular wireless communication network;
cause a query to be delivered to a location database remote from the wireless mobile communication device, the query including the received identifier for the cellular wireless communication system and requesting location information about WiFi data access points within a defined geographic region associated with the identified cellular wireless communication system while the wireless communication subsystem is not connected to any WiFi data access points;
receive a response to the query containing the location information about the WiFi data access points within the defined geographic region identified based on the cellular wireless communication system identified in the query and cause the received information to be stored in the memory subsystem; and
cause at least a portion of the location information about the WiFi data access points within the defined geographic region stored in the memory subsystem to be delivered to a user of the mobile communication device through the user interface upon request of the user and while the wireless communication subsystem is not connected to any WiFi data access points, wherein the received location information about WiFi data access points includes location information about WiFi data access points that are not associated with any cellular wireless communication system identified in the query but are located within the geographic area associated with the identified cellular wireless communication system.

2. The wireless mobile communication device of claim 1 wherein:

the wireless communication subsystem is configured to communicate with the nearest one of a plurality of different cellular wireless communication systems; and the wireless mobile communication device further comprises a location identification subsystem configured to determine the location of the wireless mobile communication device based on the identity of the cellular wireless communication system with which the wireless communication subsystem is communicating.

3. The wireless mobile communication device of claim 2 wherein the location identification subsystem is configured to cause the query to be delivered to a remote system location database remote from the wireless mobile communication device which contains system location information identifying the geographic area serviced by each of the cellular wireless communication systems, the query containing the received identifier indicative of the identity of the cellular wireless communication system with which the wireless communication subsystem is communicating.

4. The wireless mobile communication device of claim 3 wherein each cellular wireless communication system has a System Identification (SID) number, wherein the remote system location database includes information indicative of the geographic area serviced by each cellular wireless communication system based on its SID, and wherein the query caused to be delivered by the location identification subsystem includes the SID of the cellular wireless communication system with which the wireless communication subsystem is communicating.

5. The wireless mobile communication device of claim 1 wherein:

the wireless communication subsystem is configured to communicate with the nearest one of a plurality of different cellular wireless communication networks within one of a plurality of different cellular wireless communication systems; and the wireless mobile communication device further comprises a location identification subsystem configured to determine the location of the wireless mobile communication device based on the identity of the cellular wireless communication network and the cellular wireless communication system with which the wireless communication subsystem is communicating.

6. The wireless mobile communication device of claim 5 wherein the location identification subsystem is configured to cause the query to be delivered to a remote network location database remote from the wireless mobile communication device which contains location information identifying the geographic area serviced by each of the cellular wireless communication networks within each of the cellular wireless communication systems, the query containing the received identifier indicative of the identity of the cellular wireless communication network within the cellular wireless communication system with which the wireless communication subsystem is communicating.

7. The wireless mobile communication device of claim 6 wherein each cellular wireless communication system has a System Identification (SID) number, wherein each cellular wireless communication network has a Network Identification (NID) number, wherein the remote network location database includes information indicative of the geographic area serviced by each cellular wireless communication network within each cellular wireless communication system based on its NID and SID, respectively, and wherein the query caused to be delivered by the location identification subsystem includes the SID and the NID of the cellular wireless communication network within the cellular wireless communication system with which the wireless communication subsystem is communicating.

8. The wireless mobile communication device of claim 1 wherein the processing subsystem is configured to cause the stored WiFi access point location information to be updated by causing an additional query of the same type as the query referred to in claim 1 to be delivered to the location database and by causing the WiFi access point location information which is returned as a result to be stored in the memory subsystem.

9. The wireless mobile communication device of claim 8 wherein the processing subsystem is configured to cause the stored WiFi access point location information to be updated periodically.

10. The wireless mobile communication device of claim 8 wherein the processing subsystem is configured to cause the stored WiFi access point location information to be updated in response to changes in the location of the wireless mobile communication device as determined by a location identification system of the wireless mobile communication device configured to determine the location of the wireless mobile communication device.

11. The wireless mobile communication device of claim 1 wherein the WiFi data access points through which the wireless communication subsystem is configured to wirelessly communicate are local WiFi hotspots and wherein the received WiFi access point location information include street addresses for the local WiFi hotspots.

12. The wireless mobile communication device of claim 1 wherein the processing subsystem is configured to allow a user to search through the stored WiFi access point location information using the user interface to locate one or more WiFi data access points which are nearest to the location of the wireless mobile communication device as determined by a location identification subsystem of the wireless mobile communication device.

13. The wireless mobile communication device of claim 1 wherein the processing subsystem is configured to identify one or more of the WiFi data access points within the stored WiFi access point location information that are within connectivity range of the wireless mobile communication device.

14. The wireless mobile communication device of claim 13 wherein the processing subsystem is configured to cause the wireless communication system to log onto one of the identified WiFi data access points within the stored WiFi access point location information that is within connectivity range of the wireless mobile communication device.

15. A WiFi access point location information server comprising:

a network communication subsystem configured to receive a request from a mobile communication device in communication with a cellular wireless communication system for WiFi access point location information about the location of local WiFi data access points within a geographic area serviced by the cellular wireless communication system, the request including a System Identification (SID) number identifying the cellular wireless communication system, and to deliver the WiFi access point location information to the mobile communication device in response; and a processing subsystem configured to:
receive the request from the mobile communication device via the network communication subsystem while the mobile communication device is not connected to any WiFi data access points, including the SID of the cellular wireless communication system, the request requesting system location information indicative of the geographic area serviced by each of a plurality of cellular wireless communications systems;

query a system location database, which contains the system location information indicative of the geographic area serviced by each of a plurality of cellular wireless communication systems based on an SID for each of the plurality of cellular wireless communication systems, for the geographic area serviced by the cellular wireless communication system having the received SID;

query a WiFi access point location database which contains WiFi access point information about the location of WiFi data access points within a widespread area for the WiFi access point location information of WiFi data access points that are not associated with any cellular wireless communication system identified in the request but are located within the determined geographic area of the identified cellular wireless communication system; and deliver to the mobile communication device via the network communication subsystem the WiFi access point location information for the WiFi data access points within the determined geographic area of the identified cellular wireless communication system obtained in response to the WiFi access point information query to the network communication subsystem.

16. The WiFi access point location information server of claim 15, wherein the system location database is part of the remote WiFi access point location information server.

17. The WiFi access point location information server of claim 15, wherein the system location database is not part of the remote WiFi access point location information server.

18. The wireless mobile communication device of claim 1, wherein the defined geographic region is an area within a specified distance from the mobile communication device.

19. The WiFi access point location information server of claim 15, wherein the processing subsystem is further configured to query the WiFi access point location database for WiFi access point information within a defined geographic region a specified distance from the mobile communication device.

* * * * *